(12) United States Patent
Jung et al.

(10) Patent No.: US 7,687,101 B2
(45) Date of Patent: Mar. 30, 2010

(54) DISPENSER FOR LIQUID CRYSTAL DISPLAY PANEL AND DISPENSING METHOD USING THE SAME

(75) Inventors: Sung-Su Jung, Daegu (KR); Yong-Keun Kwak, Gangwon-Do (KR)

(73) Assignee: LG Display Co., Ltd., Seoul (KR)

( * ) Notice: Subject to any disclaimer, the term of this patent is extended or adjusted under 35 U.S.C. 154(b) by 1031 days.

(21) Appl. No.: 10/699,854

(22) Filed: Nov. 4, 2003

(65) Prior Publication Data

US 2004/0090592 A1 May 13, 2004

(30) Foreign Application Priority Data

Nov. 13, 2002 (KR) .................. 10-2002-0070488

(51) Int. Cl.
B05D 5/06 (2006.01)
B05D 1/02 (2006.01)

(52) U.S. Cl. .................. 427/58; 427/256; 427/424

(58) Field of Classification Search .................. 427/68, 427/256, 424, 58; 118/8, 668, 680–681
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |

(Continued)

FOREIGN PATENT DOCUMENTS

EP    1 003 066    5/2000

(Continued)

*Primary Examiner*—Timothy H Meeks
*Assistant Examiner*—Jimmy Lin
(74) *Attorney, Agent, or Firm*—McKenna Long & Aldridge LLP

(57) ABSTRACT

A dispenser for a liquid crystal display panel includes a table on which a substrate is loaded, an aligning substrate provided at least along one side of the substrate, at least one syringe having a nozzle at an end portion for supplying a material onto the substrate or onto the aligning substrate; and an image camera provided at a side of the syringe for detecting an image of the material on the substrate or on the aligning substrate.

5 Claims, 10 Drawing Sheets

U.S. PATENT DOCUMENTS

| | | | |
|---|---|---|---|
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,175,395 B1 * | 1/2001 | Yamazaki et al. | 349/44 |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 2001/0013920 A1 * | 8/2001 | Hashimoto et al. | 349/187 |
| 2001/0021000 A1 | 9/2001 | Egami | |
| 2002/0123210 A1 * | 9/2002 | Liu | 438/459 |
| 2003/0083203 A1 * | 5/2003 | Hashimoto et al. | 505/100 |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 05-345160 * | 12/1993 |
| JP | H06-018829 | 1/1994 |
| JP | 6-51256 | 2/1994 |
| JP | H06-064229 | 3/1994 |
| JP | 6-148657 | 5/1994 |
| JP | 6-160871 | 6/1994 |
| JP | H06-194637 | 7/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 8-101395 | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 8-190099 | 7/1996 |
| JP | H08-173874 | 7/1996 |
| JP | 8-240807 | 9/1996 |
| JP | 9-5762 | 1/1997 |
| JP | 9-26578 | 1/1997 |
| JP | H09-001026 | 1/1997 |
| JP | 9-61829 | 3/1997 |
| JP | 9-73075 | 3/1997 |
| JP | 9-73096 | 3/1997 |
| JP | H09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |

| | | | | | |
|---|---|---|---|---|---|
| JP | 2001-183683 | 7/2001 | JP | 2002-156518 | 5/2002 |
| JP | 2001-201750 | 7/2001 | JP | 2002-169166 | 6/2002 |
| JP | 2001-209052 | 8/2001 | JP | 2002-169167 | 6/2002 |
| JP | 2001-209056 | 8/2001 | JP | 2002-182222 | 6/2002 |
| JP | 2001-209057 | 8/2001 | JP | 2002-202512 | 7/2002 |
| JP | 2001-209058 | 8/2001 | JP | 2002-202514 | 7/2002 |
| JP | 2001-209060 | 8/2001 | JP | 2002-214626 | 7/2002 |
| JP | 2001-215459 | 8/2001 | JP | 2002-229042 | 8/2002 |
| JP | 2001-222017 | 8/2001 | JP | 2002-236276 | 8/2002 |
| JP | 2001-235758 | 8/2001 | JP | 2002-258299 | 8/2002 |
| JP | 2001-255542 | 9/2001 | JP | 2002-236292 | 9/2002 |
| JP | 2001-264782 | 9/2001 | JP | 2002-277865 | 9/2002 |
| JP | 2001-272640 | 10/2001 | JP | 2002-277866 | 9/2002 |
| JP | 2001-281675 | 10/2001 | JP | 2002-277881 | 9/2002 |
| JP | 2001-281678 | 10/2001 | JP | 2002-287156 | 10/2002 |
| JP | 2001-282126 | 10/2001 | JP | 2002-296605 | 10/2002 |
| JP | 2001-305563 | 10/2001 | JP | 2002-311438 | 10/2002 |
| JP | 2001-330837 | 11/2001 | JP | 2002-311440 | 10/2002 |
| JP | 2001-330840 | 11/2001 | JP | 2002-311442 | 10/2002 |
| JP | 2001-356353 | 12/2001 | JP | 2002-323687 | 11/2002 |
| JP | 2001-356354 | 12/2001 | JP | 2002-323694 | 11/2002 |
| JP | 2002-14360 | 1/2002 | JP | 2002-333628 | 11/2002 |
| JP | 2002-23176 | 1/2002 | JP | 2002-333635 | 11/2002 |
| JP | 2002-49045 | 2/2002 | JP | 2002-333843 | 11/2002 |
| JP | 2002-079160 | 3/2002 | JP | 2002-341329 | 11/2002 |
| JP | 2002-82340 | 3/2002 | JP | 2002-341355 | 11/2002 |
| JP | 2002-90759 | 3/2002 | JP | 2002-341356 | 11/2002 |
| JP | 2002-90760 | 3/2002 | JP | 2002-341357 | 11/2002 |
| JP | 2002-107740 | 4/2002 | JP | 2002-341358 | 11/2002 |
| JP | 2002-122870 | 4/2002 | JP | 2002-341359 | 11/2002 |
| JP | 2002-122872 | 4/2002 | JP | 2002-341362 | 11/2002 |
| JP | 2002-122873 | 4/2002 | KR | 2000-0035302 | 6/2000 |
| JP | 2002-131762 | 5/2002 | | | |
| JP | 2002-139734 | 5/2002 | | | |

* cited by examiner

DISPENSER FOR LIQUID CRYSTAL DISPLAY PANEL AND DISPENSING METHOD USING THE SAME

This application claims the benefit of the Korean Application No. P2002-070488 filed on Nov. 13, 2002, which is hereby incorporated by reference.

BACKGROUND OF THE INVENTION

1. Field of the Invention

The present invention relates to a dispenser for a liquid crystal display panel and a dispensing method using the same, and more particularly, to a dispenser for a liquid crystal display panel and its dispensing method using the dispenser to control a gap between a large-sized substrate and a nozzle, or to align nozzles.

2. Discussion of the Related Art

In general, a liquid crystal display panel is a display device where data signals according to picture information are individually supplied to liquid crystal cells arranged in a matrix form. Light transmittance of the liquid crystal cells is controlled to display a desired picture according to the picture information. The liquid crystal display device includes a liquid crystal display panel in which the liquid crystal cells are arranged in a matrix form, and a driver integrated circuit (IC) for driving the liquid crystal cells. More particularly, the liquid crystal display panel includes a color filter substrate and a thin film transistor array substrate attached to each other. The liquid crystal display panel further includes a liquid crystal layer in between the color filter substrate and the thin film transistor array substrate.

Data lines and gate lines are formed on the thin film transistor array substrate of the liquid crystal display panel, to cross at right angles, thereby defining liquid crystal cells at every crossing. The data lines transmit a data signal supplied from the data driver integrated circuit to the liquid crystal cells, and the gate lines transmit a scan signal supplied from the gate driver integrated circuit to the liquid crystal cells. At one end portion of each of the data lines and gate lines, a data pad and a gate pad are provided in which data signals and scan signals are applied from the data driver integrated circuit and the gate driver integrated circuit. The gate driver integrated circuit sequentially supplies the scan signal to the gate lines so that the liquid crystal cells arranged in the matrix form can be sequentially selected one line by one line while a data signal is supplied to the selected one line of the liquid crystal cells from the data driver integrated circuit.

A common electrode and a pixel electrode are respectively formed on the inner opposing sides of the color filter substrate and the thin film transistor array substrate such that an electric field can be applied to the liquid crystal layer. The pixel electrode is formed in each liquid crystal cell on the thin film transistor array substrate, while the common electrode is integrally formed across the entire surface of the color filter substrate. By controlling a voltage applied to the pixel electrode in a state where a voltage is applied to the common electrode, light transmittance of each liquid crystal cells can be individually controlled.

To control the voltage applied to the pixel electrode by liquid crystal cells, a thin film transistor is used as a switching device in each liquid crystal cell. Other elements of the liquid crystal display device will now be describe in reference to FIG. 1, which is a plane view of the unit liquid crystal display panel formed by a thin film transistor array substrate and a color filter substrate according to the related art. As shown in FIG. 1, the liquid crystal display panel 100 includes an image display part 113 where the liquid crystal cells are arranged in a matrix form, a gate pad part 114 connected to the gate lines of the image display part 113, and a data pad part 115 connected to the data lines of the image display part 113. The gate pad part 114 and the data pad part 115 are formed along an edge region of the thin film transistor array substrate 101 which does not overlap with the color filter substrate 102. The gate pad part 114 supplies a scan signal from the gate driver integrated circuit to the gate lines of the image display part 113. The data pad part 115 supplies image information from the data driver integrated circuit to the data lines of the image display part 113.

Data lines to which image information is applied and gate lines to which a scan signal is applied are provided on the thin film transistor array substrate 101. The data lines and the gate lines cross each other. Additionally, a thin film transistor for switching the liquid crystal cells is provided at the crossing of the data lines and the gate lines. A pixel electrode for driving the liquid crystal cells is connected to the thin film transistor and provided on the thin film transistor array substrate 101. A passivation film for protecting the pixel electrode and the thin film transistor is formed over the entire surface of the thin film transistor array substrate 101.

Color filters separately coated in each of the cell regions are separated by a black matrix on the color filter substrate 102. In addition, a common transparent electrode is provided on the color filter substrate 102. The thin film transistor array substrate 101 and the color filter substrate 102 are separated by a cell gap. The cell gap is maintained by a spacer between the thin film transistor array substrate 101 and the color filter substrate 102, which are attached by a seal pattern 116 formed along an outer edge of the image display part 113, thereby forming a unit liquid crystal display panel.

In fabricating a unit liquid crystal display panel, a method for simultaneously forming a plurality of unit liquid crystal display panels on a large-scale mother substrate is typically used. This method requires a process for separating the unit liquid crystal display panels from the large-scale mother substrate. Subsequently, a unit liquid crystal display panel separated from the large-scale mother substrate has liquid crystal is injected through a liquid crystal injection opening to form a liquid crystal layer in the cell-gap which separates the thin film transistor array substrate 101 and the color filter substrate 102. Then the liquid crystal injection opening is sealed.

To fabricate a unit liquid crystal display panel, thee following processes are generally required: the thin film transistor array substrate 101 and the color filter substrate 102 are separately fabricated on first and second mother substrates; the first and second mother substrates are attached such that a uniform cell-gap is maintained therebetween; the attached first and second mother substrates are cut into unit panels; and then liquid crystal is injected into the cell-gap between the thin film transistor array substrate 101 and the color filter substrate 102. A process of forming the seal pattern 116 along an outer edge of the image display part 113 is required to attach the thin film transistor array substrate 101 and the color filter substrate 102. The related art method of seal pattern forming will now be described.

FIGS. 2A and 2B illustrate a screen printing method to form a seal pattern according to the related art. As shown in FIGS. 2A and 2B, a screen mask 206 is patterned so that a seal pattern forming region is selectively exposed. Then, a rubber squeegee 208 for selectively supplying a sealant 203 to the substrate 200 through the screen mask 206 is used to draw the sealant to form the seal patterns 216A~216C to prevent leakage of liquid crystal. The seal patterns 216A~216C formed on the substrate 200 have a gap in which liquid crystal is injected.

Thus, the seal patterns 216A~216C are formed along an outer edge of the image display parts 213A~213C of the substrate 200 and liquid crystal injection openings 204A~204C are formed at one side of the seal patterns 216A~216C.

The screen printing method includes: applying the sealant 203 on the screen mask 206 with a seal pattern forming region patterned thereon; forming the seal patterns 216A~216C on the substrate 200 through printing with the rubber squeegee 208; drying the seal patterns 216A~216C by evaporating a solvent contained in the seal patterns 216A~216C; and leveling it. The screen printing method is widely used because of its advantage of convenience in process. However, it is disadvantageous in that much sealant 203 is consumed since the sealant 203 is applied across the entire surface of the screen mask 206 and printed with the rubber squeegee 208 to form the seal patterns 216A~216C. The excess sealant is wasted. In addition, the screen printing method has another disadvantage in that a rubbed orientation film (not shown) formed on the substrate 200 is degraded as a result of the screen mask 206 being brought into contact with the substrate 200. The degradation of the rubbed orientation film degrades picture quality of the liquid crystal display device. Therefore, to overcome the shortcomings of the screen printing method, a seal dispensing method has been proposed.

FIG. 3 is an exemplary view of a dispensing method for forming a seal pattern. As shown in FIG. 3, while a table 310 with the substrate 300 loaded thereon is being moved in forward/backward and left/right directions, a plurality of seal patterns 316A~316C are simultaneously formed along an outer edge of the image display parts 313A~313C of the substrate 300 by applying a certain pressure to sealant within a plurality of syringes 301A~301C. In the seal dispensing method, as the sealant is selectively supplied only to the region where the seal patterns 316A~316C are to be formed, sealant consumption is reduced compared to the screen printing method. In addition, since the syringes 301A~301C are not in contact with orientation films (not shown) of the image display parts 313A~313C of the substrate 300, the rubbed orientation film will not be damaged and thus a picture quality of the liquid crystal display device will not be degraded.

In the case of simultaneously forming the seal patterns 316A~316C on the substrate 300 loaded on the table 310 by using the plurality of syringes 301A~301C, a technique for precisely aligning the plural syringes 301A~301C and a technique for precisely controlling a gap between the substrate 300 and the syringes 301A~301C are required. That is, if the plural syringes 301A~301C are not properly aligned, the plural seal patterns 316A~316C may be formed rather within the image display parts 313A~313C rather than being formed along the outer edge of the image display parts 313A~313C, which would result in a defective liquid crystal display panel. In addition, if the substrate 300 and the syringes 301A~301C are too close to the substrate 300 or have narrower gap than the desired gap, the seal patterns 316A~316C formed on the substrate 300 are formed too wide and too low. If, however, the substrate 300 and the syringes 301A~301C are too far from the substrate 300 or have a wider gap than the desired gap, the seal patterns 316A~316C formed on the substrate 300 are formed too narrow and too high.

In the related art, a dummy substrate is used to align the plural syringes 301A~301C and to adjust the gap between the substrate 300 and the syringes 301A~301C, which will now be described with reference to FIG. 4, which is an exemplary view showing a seal dispenser of a liquid crystal display panel in accordance with the related art. As shown in FIG. 4, the related art seal dispenser includes: a dummy substrate 401 loaded on a table 400; a plurality of syringes 402A~402C filled with a sealant; nozzles 403A~403C provided at one end portion of the syringes 402A~402C and supplying the sealant onto the dummy substrate 401; and image cameras 404A~404C respectively provided at the side of the syringes 403A~403C.

First, in order to adjust the gap between the dummy substrate 401 and the syringes 402A~402C, the syringes 402A~402C are sequentially lowered so that the nozzles 403A~403C just come into contact with the surface of the dummy substrate 401. Then, the nozzles 403A~403C are raised to a predetermined height above the surface of the dummy substrate 401 to thereby obtaining a desired gap between the dummy substrate 401 and the syringes 402A~402C. To align the syringes 402A~402C, the sealant is applied on the dummy substrate 401 through the nozzles 403A~403C to form a vertically crossing seal pattern, and then an image of the seal pattern is detected with the image cameras 404A~404C provided at the syringes 402A~402C to check the alignment state and the position of the syringes 402A~402C is compensated. After the dummy substrate 401 and the syringes 402A~402C are adjusted to have a desired gap therebetween and the syringes 402A~402C are aligned, the dummy substrate 401 is unloaded and a substrate on which a seal pattern is to be formed is loaded on the table 400 and a seal pattern is formed on the substrate.

As the size of liquid crystal display panel increase, the area of the substrate used to fabricate a liquid crystal display panel increases. The size of a substrate for fabricating the liquid crystal display panel is practically the same as the dummy substrate 401 except that the former is used for actually fabricating a liquid crystal display panel. Loading and unloading of the dummy substrate 401 are performed manually by an operator. Thus, if the size of the dummy substrate 401 is large, it is very difficult to load and unload the dummy substrate 401, causing a delay in the process and thus degrading productivity. In addition, manually loading and unloading the dummy substrate 401 increases the chances that a dummy substrate may be damaged, which increases fabrication cost. Moreover, since space is required for the operator to perform the loading and unloading of the dummy substrate 401, a space efficiency of a clean room is degraded and thus facility expense is increased.

SUMMARY OF THE INVENTION

Therefore, an object of the present invention is to provide a dispenser for a liquid crystal display panel and a dispensing method using the same for adjusting a gap between a nozzle and a substrate or aligning nozzles.

To achieve these and other advantages and in accordance with the purpose of the present invention, as embodied and broadly described herein, there is provided a dispenser for a liquid crystal display panel including a table on which a substrate is loaded, an aligning substrate provided at least along one side of the substrate, at least one syringe having a nozzle at an end portion for supplying a material onto the substrate or onto the aligning substrate; and an image camera provided at a side of the syringe for detecting an image of the material on the substrate or on the aligning substrate.

To achieve the above objects, there is also provided a dispensing method for a liquid crystal display panel including: attaching an aligning substrate at least along one side of a table; moving the table so that a syringe can be positioned over the aligning substrate; lowering the syringe so that a nozzle of the syringe contacts the aligning substrate; raising the syringe so that the nozzle of the syringe and the aligning substrate have a desired gap therebetween; providing a substrate adjacent to the aligning substrate; and dispensing a material onto the substrate through the syringe.

In another aspect, there is also provided a dispensing method for a liquid crystal display panel including: attaching an aligning substrate on at least one side of a table; moving the table so that a plurality of syringes are positioned over the aligning substrate; applying material onto the aligning substrate through a nozzle provided at end portions of each of the plurality of syringes to form a plurality of alignment patterns on the aligning substrate; detecting an image of the alignment patterns through an image camera provided at each side of the plurality of syringes; aligning the plurality of syringes on the basis of the image of the alignment patterns detected through the image camera; providing a substrate adjacent to the aligning substrate; and dispensing the material onto the substrate through the plurality of syringes.

In another aspect, there is also provided a dispensing method for a liquid crystal display panel including: attaching an aligning substrate on at least one side of a table; moving the table so that a plurality of syringes are positioned on the aligning substrate; lowering the syringes so that the nozzles provided at end portions of each of the plurality of syringes contacts the aligning substrate; raising the syringes so as to obtain a desired gap between the aligning substrate and the nozzles; applying a material onto the aligning substrate through the nozzles and forming a plurality of alignment patterns on the aligning substrate; detecting an image of the alignment patterns through an image camera provided at each side of the plurality of the syringes; aligning the plurality of syringes on the basis of the image of the alignment patterns detected by the image camera; providing a substrate adjacent to the aligning substrate; and dispensing the material onto the substrate through the plurality of syringes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
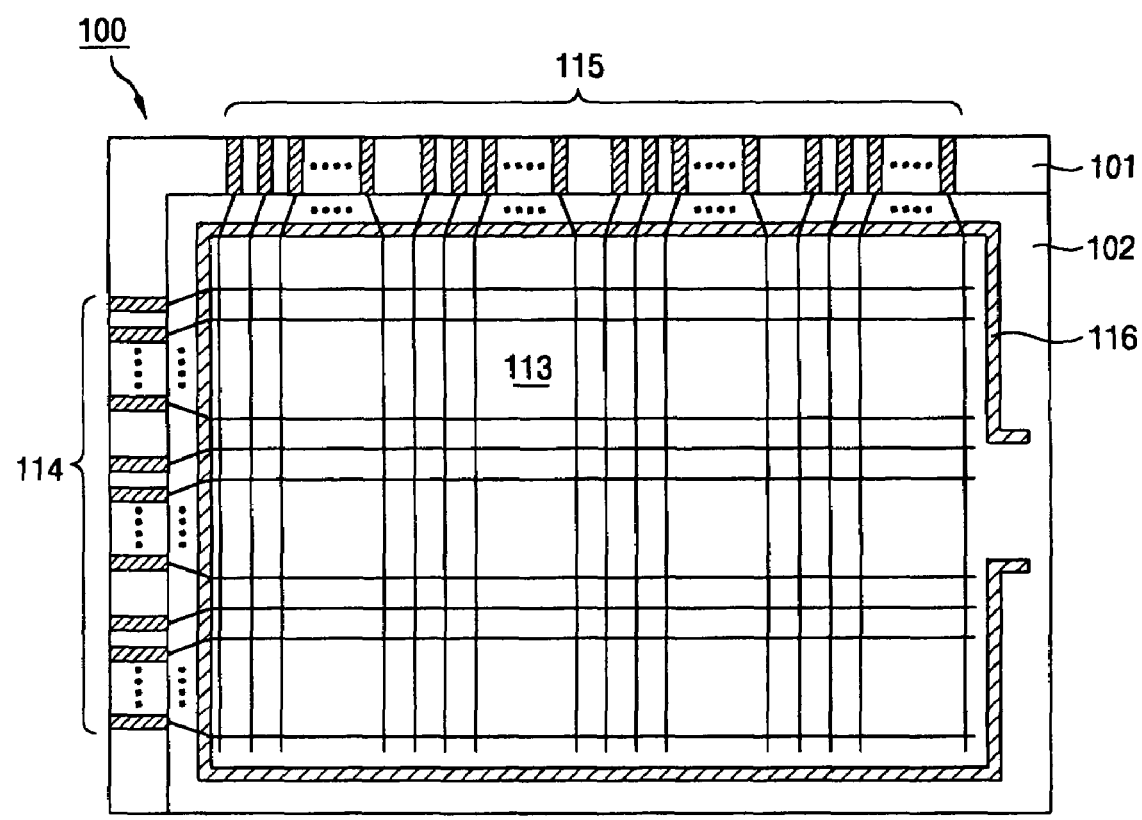
FIG. 1 is a plane view of the unit liquid crystal display panel formed by a thin film transistor array substrate and a color filter substrate according to the related art.
Figure 2A:
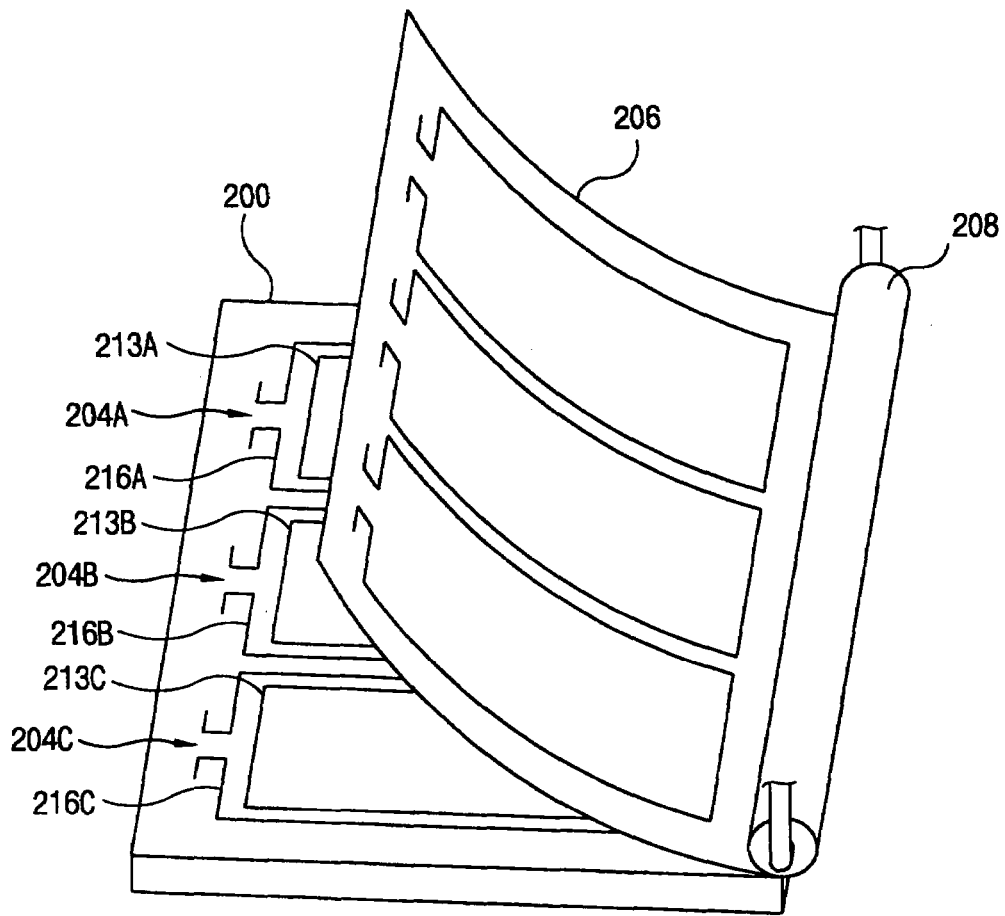
FIGS. 2A and 2B illustrate formation of a seal pattern through a screen printing method in accordance with the related art.
Figure 2B:
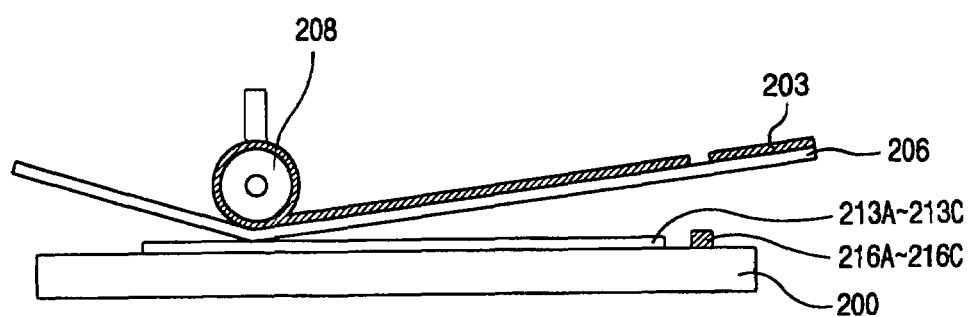
Figure 3:
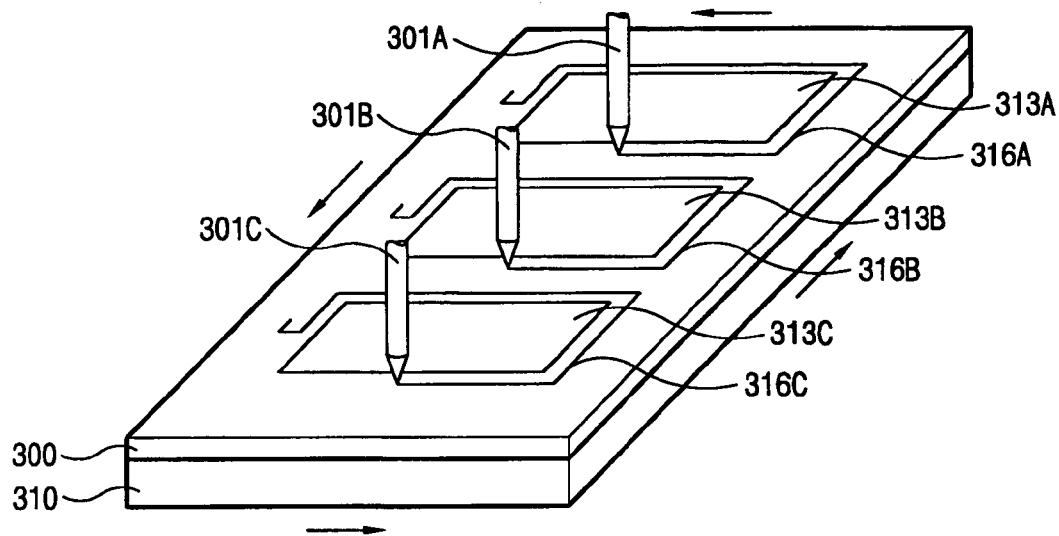
FIG. 3 illustrates formation of a seal pattern through a seal dispensing method in accordance with the related art.
Figure 4:
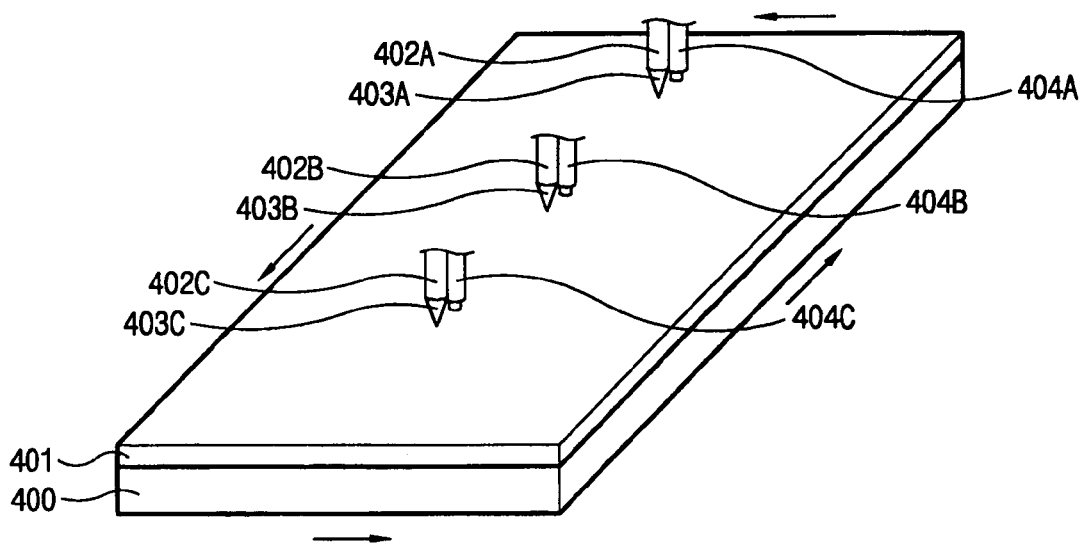
FIG. 4 illustrates a seal dispenser of a liquid crystal display panel in accordance with the related art.
Figure 5:
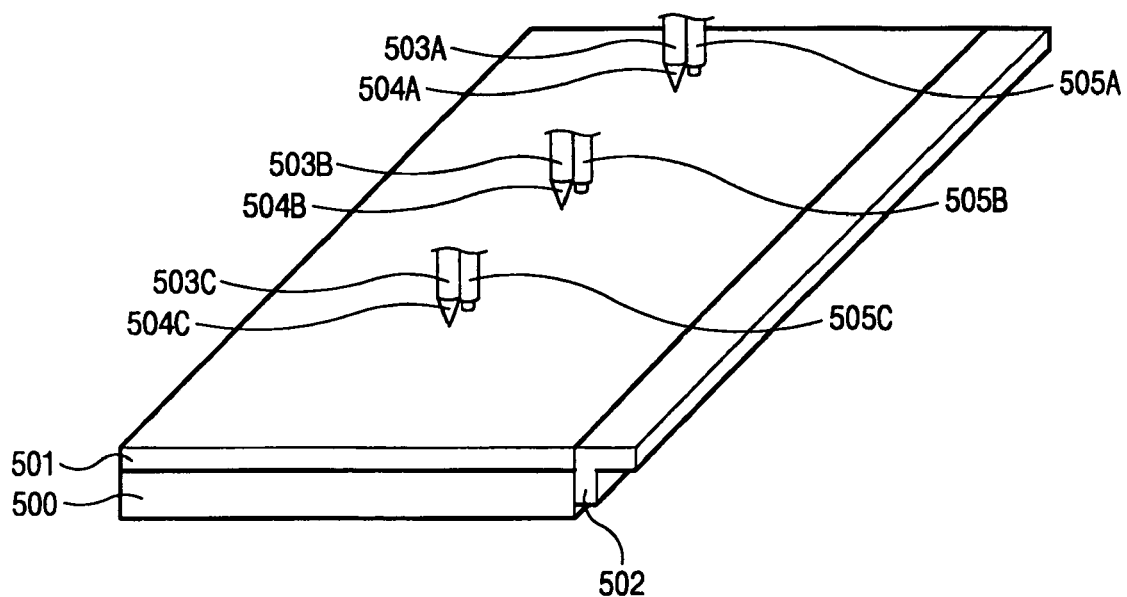
FIG. 5 is an exemplary view showing a dispenser for a liquid crystal display panel in accordance with the present invention.

FIG. 5 is an exemplary view showing a dispenser for a liquid crystal display panel in accordance with the present invention. As shown in FIG. 5, a dispenser for a liquid crystal display panel in accordance with the present invention includes: a table 500 on which a substrate 501 is loaded; an aligning substrate 502 provided at one side of the table 500; a plurality of syringes 503A~503C each filled with sealant; nozzles 504A~504C provided at each one end portion of the syringes 503A~503C for applying the sealant on the aligning substrate 502 to form a plurality of alignment patterns or applying the sealant on the substrate 501 to form a plurality of seal patterns; and image cameras 505A~505C provided at the side of the syringes 503A~503C and detecting an image of the alignment patterns or the seal patterns.

The substrate 501 may be a large-scale mother substrate formed of glass with a plurality of thin film transistor array substrates formed thereon or a large-scale mother substrate formed of glass with a plurality of color filter substrates formed thereon. An aligning substrate 502 is formed of glass that is more than a few times or scores of times narrower than a width of the substrate 501. The aligning substrate 502 is attached along a side of the table 500. The aligning substrate 502 may be provided at every side of the table 500, as well as at one side of the table 500. Further, the aligning substrate 502 may be attached so that an upper surface of the aligning substrate is level with the substrate 501.

The relative position relation between the table 500 and the syringes 503A~503C can be changed, that is, by moving either the table 500 or the plurality of syringes 503A~503C. The sealant is supplied through the nozzles 504A~504C to form a plurality of alignment patterns on the aligning substrate 502 or a plurality of seal patterns on the substrate 501 while the relative position between the table 500 and the syringes 503A~503C is changing. That is, either the table 500 or the plurality of syringes 503A~503C may be horizontally moved. In this respect, however, if the plurality of syringes 503A~503C are horizontally moved, there is a possibility that a foreign material is generated due to driving of the syringes 503A~503C and adsorbed on the substrate 501 where the liquid crystal display panel is fabricated. Therefore, the table 500 is preferably horizontally moved in forward/backward and left/right directions.

Figure 6A:
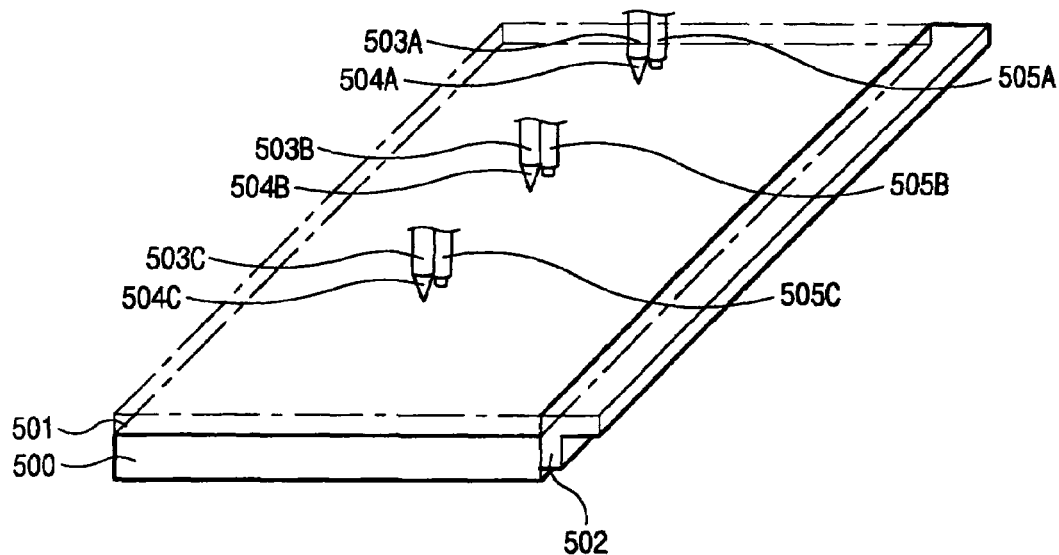
FIGS. 6A to 6D are sequential exemplary views showing a dispensing method using the dispenser for a liquid crystal display panel of FIG. 5 in accordance with a first embodiment of the present invention.

FIGS. 6A to 6D are sequential exemplary views showing a dispensing method using the dispenser for a liquid crystal display panel in accordance with a first embodiment of the present invention. As shown in FIG. 6A, the aligning substrate 502 is attached at one side of the table 500. After the aligning substrate 502 is attached at one side of the table 500, the substrate 501 may be loaded at the upper surface of the table 500. A plurality of syringes 503A~503C that each have a nozzles 504A~504C provided at one end portion thereof are provided over the substrate 501. Image cameras 505A~505C are provided at the side of each of the plurality of syringes 503A~503C. The nozzles 504A~504C are separated from the aligning substrate 502 with a desired gap therebetween. In the alternative, the nozzles 504A~504C of the syringes 503A~503C may be first adjusted to have a desired gap between themselves and the aligning substrate 502 and then the substrate 501 may be loaded at the upper surface of the table 500.

Figure 6B:
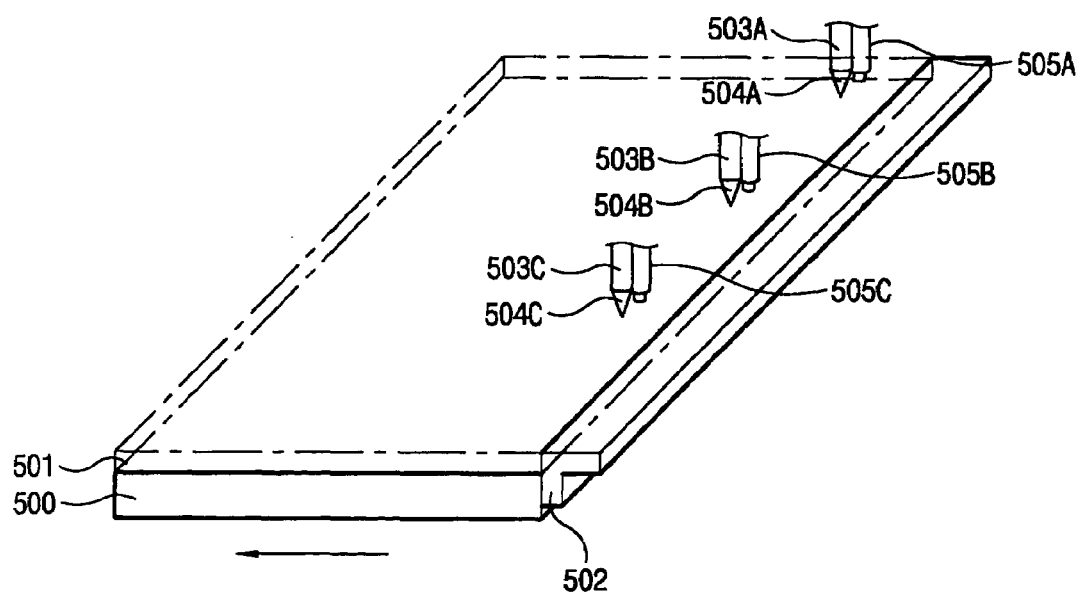
Figure 6C:
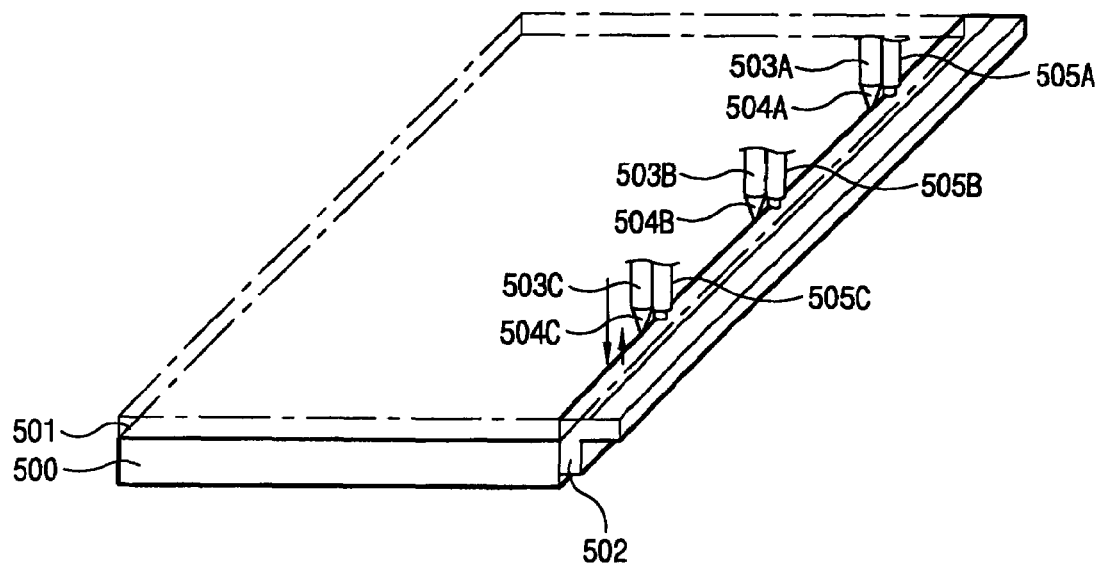
Figure 6D:
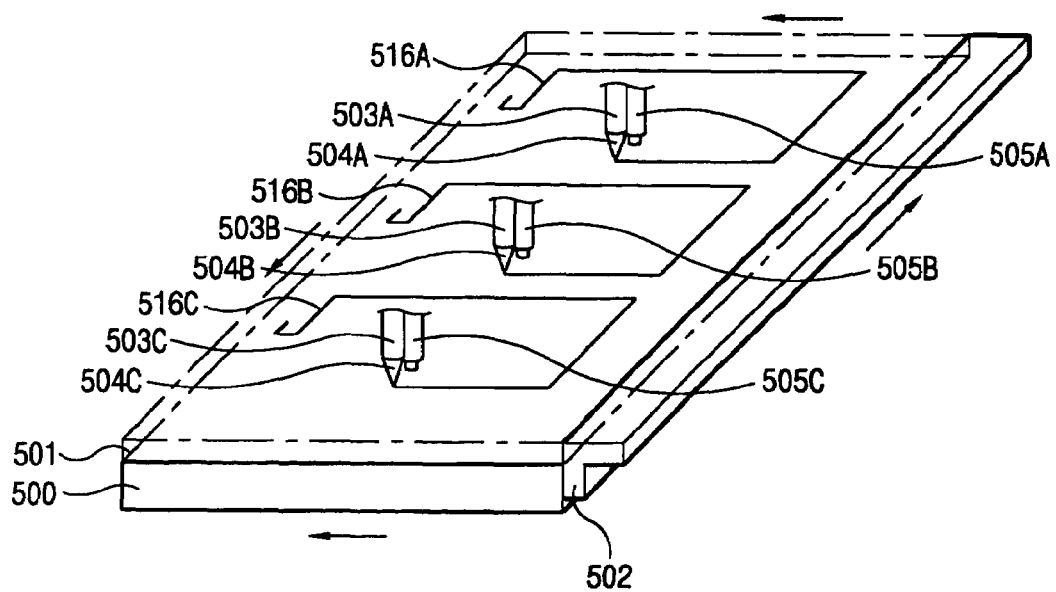

The method of aligning and use the dispenser of the first embodiment for setting a desired spacing will be described in reference to FIGS. 6B to 6D. As shown in FIG. 6B, the table 500 is horizontally moved in one direction so that the plurality of syringes 503A~503C may be positioned at an upper side of the aligning substrate 502. As shown in FIG. 6C, the syringes 503A~503C are lowered so that the nozzles 504A~504C at one end portion of the syringes 503A~503C can just contact the aligning substrate 502. Then, the syringes 503A~503C are raised to have a desired gap between themselves and the aligning substrate 502. For example, an operator may sequentially lower the syringes 503A~503C to allow the nozzles 504A~504C to just be in contact with the aligning substrate 502 and raise them ascend one by one to have a desired gap with the aligning substrate 502. In another example, an operator may sequentially lower and raise each syringe 503A~503C individually such that each is set to a desired gap individually. As shown in FIG. 6D, while the table 500 is being horizontally moved in forward/backward and left/right directions, the sealant is applied through the nozzles 504A~504C of the syringes 503A~503C controlled to have a desired gap between themselves and the aligning substrate 502, so as to form a plurality of seal patterns on the substrate 501.

Figure 7A:
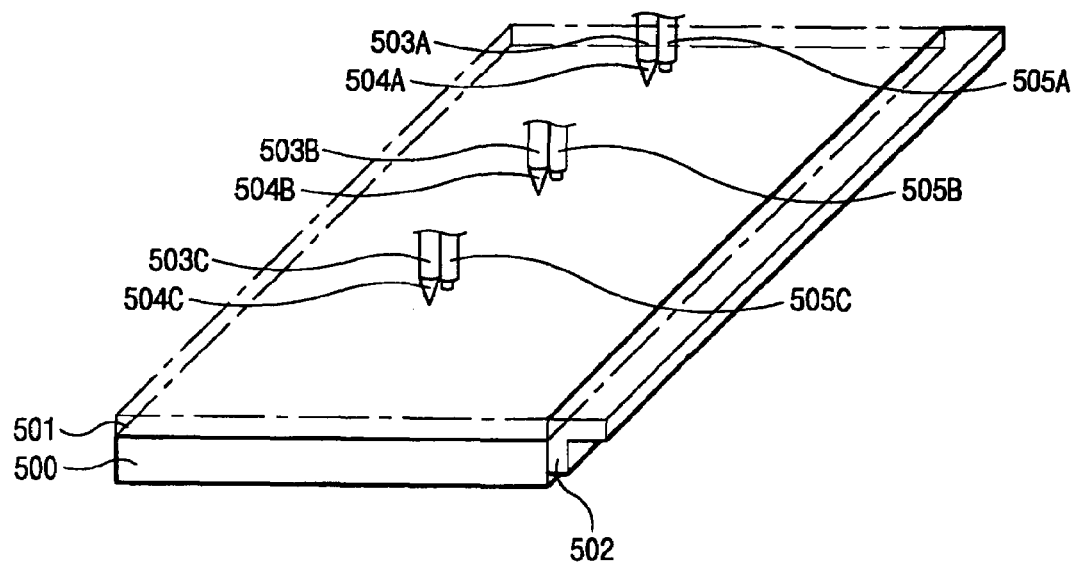
FIGS. 7A to 7F are sequential exemplary views showing a dispensing method using the dispenser for a liquid crystal display panel of FIG. 5 in accordance with a second embodiment of the present invention.

FIGS. 7A to 7F are sequential exemplary views showing a dispensing method using the dispenser for a liquid crystal display panel in accordance with a second embodiment of the present invention. As shown in FIG. 7A, the aligning substrate 502 is attached at one side of the table 500. After the aligning substrate 502 is attached at one side of the table 500, the substrate 501 may be loaded at the upper surface of the table 500. A plurality of syringes 503A~503C that each have a nozzles 504A~504C provided at one end portion thereof are provided over the substrate 501. Image cameras 505~505C are provided at the side of each of the plurality of syringes 503A~503C. The nozzles 504A~504C are then aligned using the aligning substrate 502 to a desired spacing. In the alternative, the nozzles 504A~504C of the syringes 503A~503C may be first adjusted to have a desired spacing and then the substrate 501 may be loaded at the upper surface of the table 500.

Figure 7B:
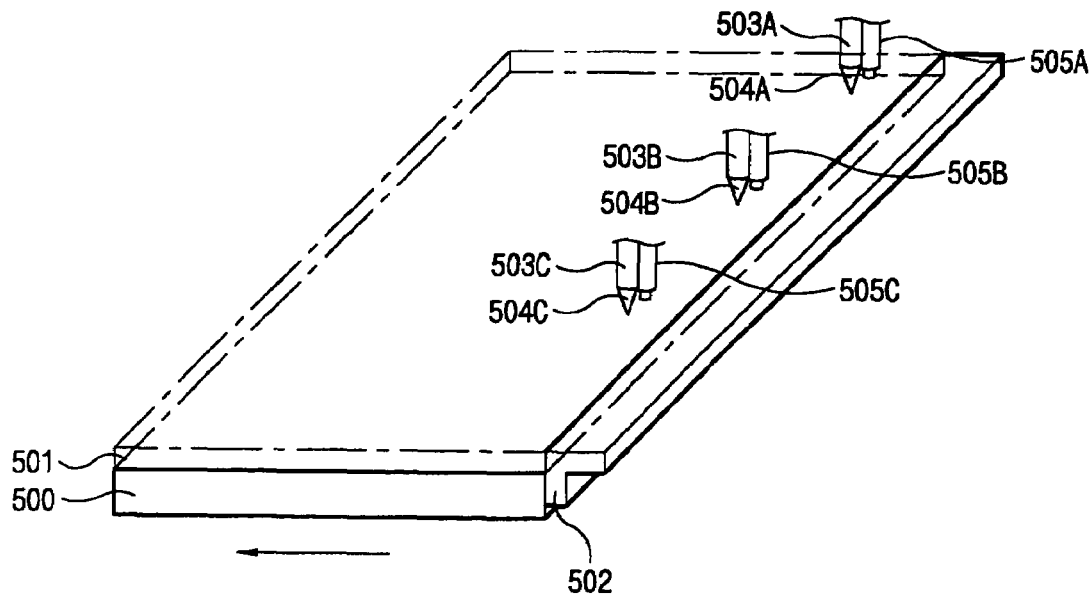
Figure 7C:
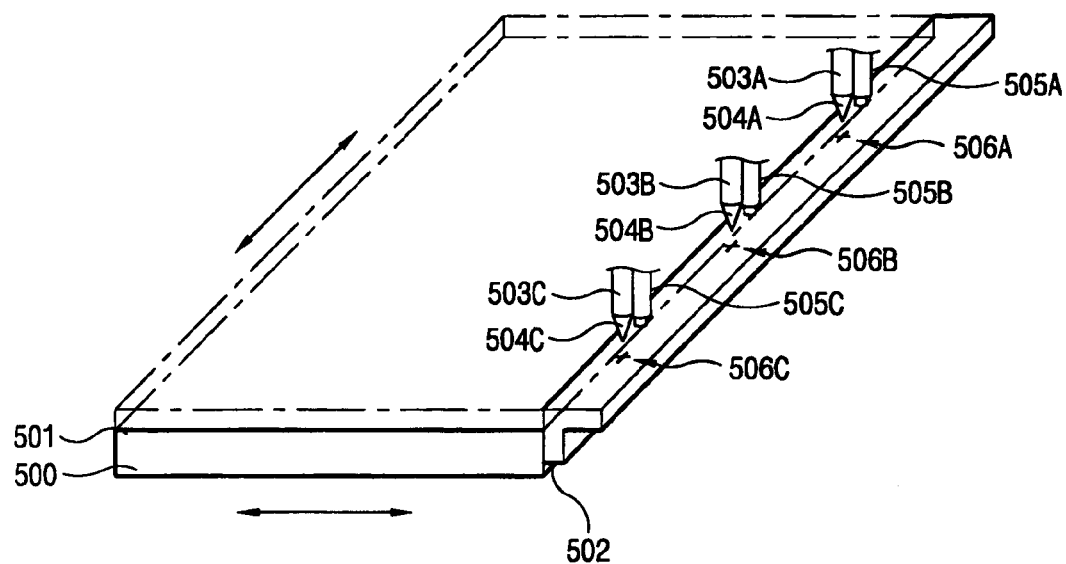
Figure 7D:
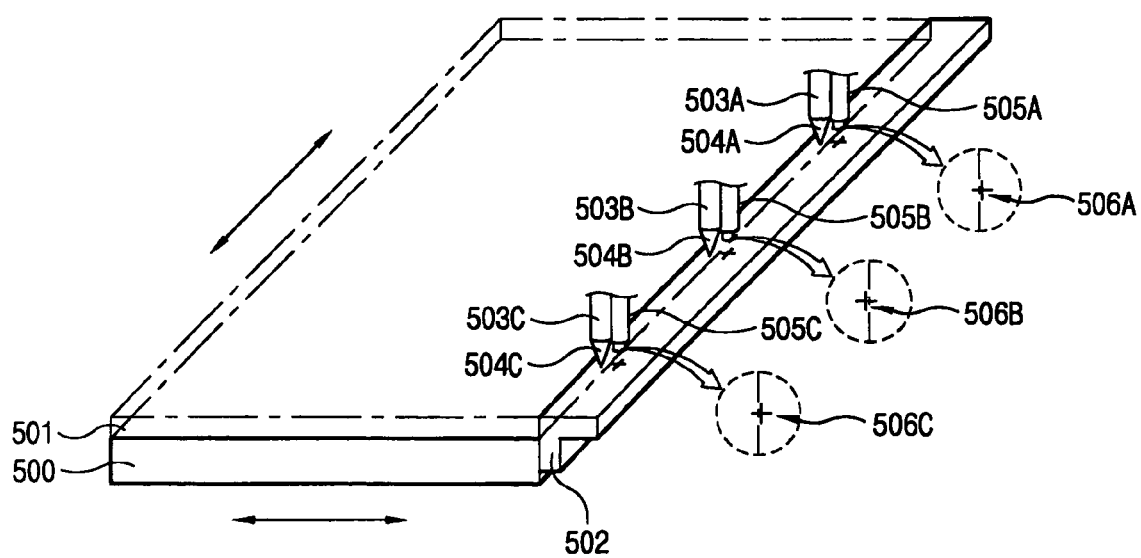
Figure 7E:
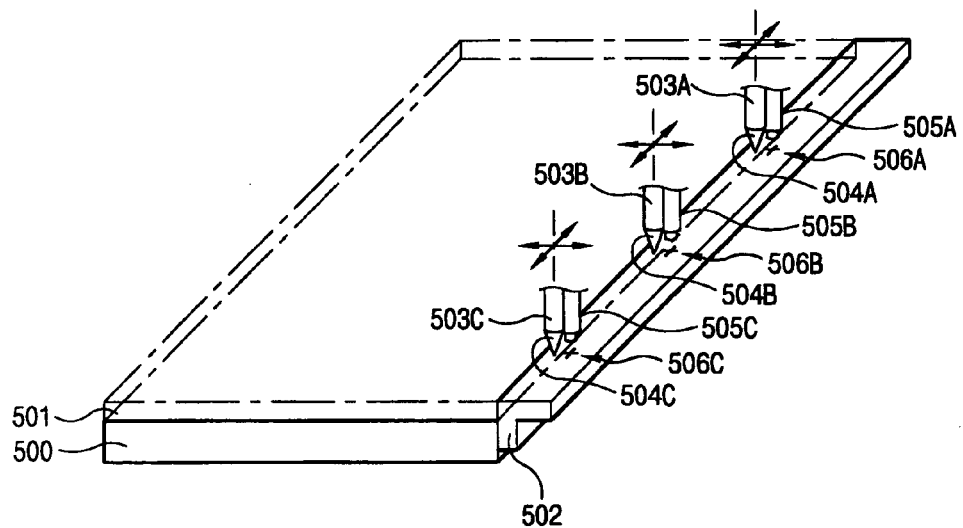
Figure 7F:
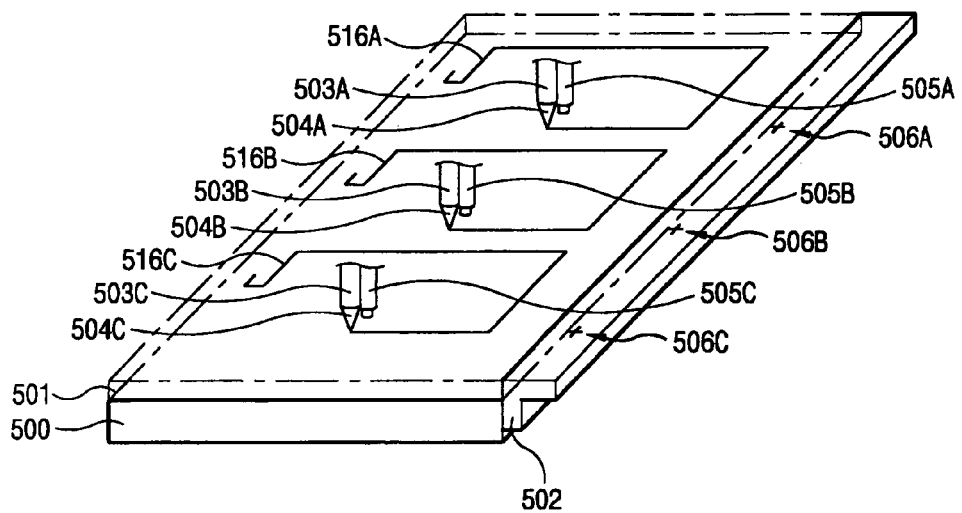

The method of aligning and use the dispenser of the first embodiment for aligning the nozzles will be described in reference to FIGS. 7B to 7F. As shown in FIG. 7B, the table 500 is horizontally moved in one direction so that the plurality of syringes 503A~503C can be positioned at an upper side of the aligning substrate 502. As shown in FIG. 7C, while the table 500 is horizontally moved in forward/backward and left/right directions, the sealant is applied through the nozzles 504A~504C provided at each one end portion of the syringes 503A~503C to form a plurality of alignment patterns 506A~506C on the aligning substrate 502 simultaneously. As shown in FIG. 7D, an image of the alignment patterns 506A~506C is detected with the image cameras 505A~505C provided at each side of the syringes 503A~503C. As shown in FIG. 7E, the syringes 503A~503C are aligned on the basis of the image of the alignment patterns 506A~506C detected by the image cameras 505A~505C. As shown in FIG. 7F, while the table 500 is horizontally moved in forward/backward and left/right directions, the sealant is applied through the nozzles 505A~504C of the syringes 503A~503C to form a plurality of seal patterns 516A~516C on the substrate 501.

As mentioned above, the first embodiment of the present invention has a feature in that the nozzles 504A~504C of the syringes 503A~503C are controlled to have a desired gap between themselves and the aligning substrate 502 and then the seal patterns 516A~516C are formed on the substrate 501. The second embodiment of the present invention has a feature in that the plurality of syringes 503A~503C are aligned by using the aligning substrate 502 and then the seal patterns 516A~516C are formed on the substrate 501. However, the first embodiment in which the gap between the aligning substrate 502 and the nozzles 504A~504C is controlled and the second embodiment in which the plurality of syringes 503A~503C are aligned may be combined for use. That is, after the nozzles 504A~504C of the syringes 503A~503C are controlled to have a desired gap with the aligning substrate 502 in accordance with the first embodiment and the plurality of syringes 503A~503C are aligned by using the aligning substrate 502, the seal patterns 516A~516C may be formed on the substrate 501. In the case of combining the first embodiment and the second embodiment of the present invention, after the gap between the aligning substrate 502 and the nozzles 504A~504C, when the nozzles 504A~504C are in contact with the aligning substrate 502, the surface of the aligning substrate 502 may be contaminated by the sealant such that a cleaning process for cleansing the surface of the aligning substrate 502 may need to be added.

As stated above, according to the dispenser for a liquid crystal display panel and the dispensing method using the same, even though the area of a substrate 501 increases to fabricate large scale liquid crystal display panel, an aligning substrate 502 with a narrow area compared to the substrate 501 can be used that is attached to the side of the table 500 on which the substrate 501 lies. More specifically, the nozzles 504A~504C of the syringes 503A~503C are controlled to have a desired gap with respect to the aligning substrate 502, the plurality of syringes 503A~503C are aligned by using the aligning substrate 502 and then the seal patterns 516A~516C are formed on the substrate 501. Rather than using such a large-scale dummy substrate 401 as in the related art, the operator may use the aligning substrate 502 with an area as narrow as a few times or scores of times narrower than the related art dummy substrate. Therefore, attachment and detachment of the aligning substrate 502 may be simply performed by the operator, and thus, a possible delay for the process may be prevented and its damage may be prevented. In addition, thanks to the narrower aligning substrate 502, the space for attaching and detaching the aligning substrate can be reduced, so that the use efficiency of the clean room may be improved.

The dispenser for a liquid crystal display panel may be also applied to a case of forming a liquid crystal layer in fabricating a liquid crystal display panel, as well as to the case of simultaneously forming the seal patterns 516A~516C on the substrate 501 through the syringes 503A~503C filled with the sealant as described above. The method for forming a liquid crystal layer may be roughly divided into a vacuum injection method and a dropping method, which will now be described in detail. First, the vacuum injection method is that a liquid crystal injection opening of a unit liquid crystal display panel separated from a large-scale mother substrate is dipped in a container filled with liquid crystal in a chamber in which a certain vacuum is set, and then liquid crystal is injected into the liquid crystal display panel according to a pressure difference between an inner side and an outer side of the liquid crystal display panel by varying a vacuum degree. After the liquid crystal is filled in the liquid crystal display panel, the liquid crystal injection opening is sealed.

The vacuum injection method as described above has the following problems. First, it takes a long time to fill the liquid crystal into the liquid crystal display panel. In general, an attached liquid crystal display panel with an area of several hundreds cm² has a gap of only a few micrometers. Thus, even with the vacuum injection method that uses the pressure difference, the injection time of liquid crystal takes a long time. For instance, in the case of fabricating a liquid crystal display panel of about 15 inches, it can take 8 hours to fill the panel with liquid crystal. Thus, with such long time taken for fabrication of the liquid crystal display panel, productivity is degraded. In addition, as liquid crystal display panels become increasingly large in size, time required for filling liquid crystal also accordingly increases.

Second, a lot of liquid crystal is consumed in the vacuum injection method. In general, an actually injected quantity of liquid crystal is very small compared to the quantity of liquid crystal filled in the container. When liquid crystal is exposed in the air or to a specific gas, it reacts and degrades. Thus, even if liquid crystal filled in the container is used to filled a plurality of liquid crystal display panels, a large quantity of liquid crystal remaining after the fillings will have to be discarded, which increases unit price of the liquid crystal display panels. To overcome such problems of the vacuum injection method, the dropping method has been suggested.

The dropping method includes dispensing liquid crystal onto a plurality of thin film transistor array substrates fabricated on one large-scale mother substrate or on a plurality of color filter substrates fabricated on another large-scale mother substrate by using the dispenser in accordance with the present invention, and then the two mother substrates are attached to each other so that liquid crystal is uniformly distributed at the entire image display regions by attaching the pressure to form a liquid crystal layer therbetween. Accordingly, with the dropping method, liquid crystal layer can be formed within a short time compared to the vacuum injection method. Even though a liquid crystal display panel is large in size, the liquid crystal layer may still be quickly formed. In addition, since liquid crystal is dropped as much as required on the substrate, such an increase in the unit price of the liquid crystal display panel as in the vacuum injection method in which the high-priced liquid crystal is discarded is prevented and a price competitiveness of its product may be strengthened.

Unlike the vacuum injection method, the dropping method occurs prior to the separating of the unit liquid crystal display panels from the large-scale mother substrate. Thus, in case of dropping liquid crystal onto the substrate through the dropping method, the dispenser for a liquid crystal display panel in accordance with the present invention may be applied. That is, the plurality of syringes 503A~503C are filled with liquid crystal, and then while the table 500 with the substrate 501 loaded thereon is horizontally moved, liquid crystal is applied through the nozzle 504A~504C to be dropped at an image display area of the substrate 501. The seal pattern does not need a liquid crystal injection opening and is formed as a closed type to encompass an outer edge of the image display area.

In the case of dropping liquid crystal on the substrate 501 by using the dispenser, a gap between the nozzles 504A~504C of the syringes 503A~503C and the substrate 501 needs to be precisely controlled like in the case of forming the seal patterns 516A~516C. Therefore, as shown in FIGS. 6A to 6C, the nozzles 504A~504C of the syringes 503A~503C are adjusted so as to have a desired gap between themselves and the substrate 501 by using the aligning substrate 502 attached at one side of the table 500, and then liquid crystal is dropped to the image display area of the substrate 501.

Figure 8:
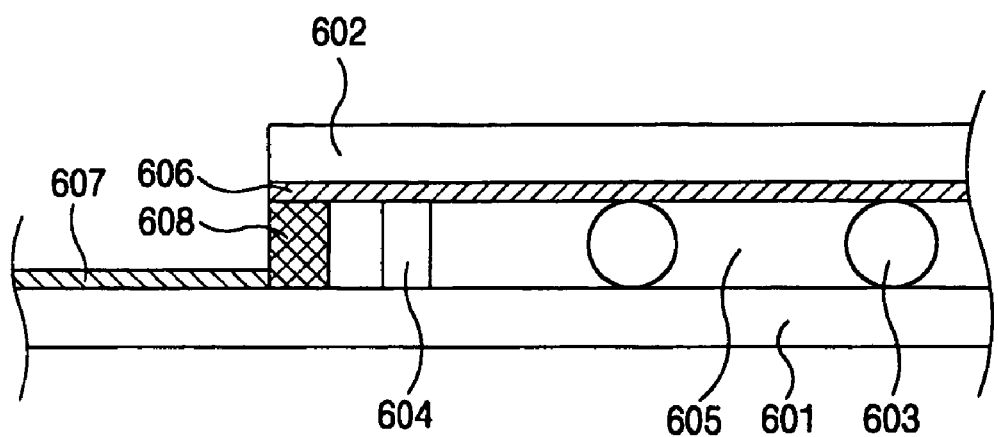
FIG. 8 is a schematic view showing a sectional structure of one edge of the liquid crystal display panel.

In addition to the cases of simultaneously forming the seal patterns 516A~516C on the substrate or dropping liquid crystal through the syringes 503A~503C filled with a sealant or liquid crystal, the dispenser for a liquid crystal display panel may be also applied to formation of an Silver (Ag) dot in fabricating a liquid crystal display panel. The formation of an Ag dot will now be described in detail in reference to FIG. 8. FIG. 8 is a schematic view showing a sectional structure of one edge of the liquid crystal display panel. As shown in FIG. 8, a liquid crystal display panel is formed such that a thin film transistor array substrate 601 and a color filter substrate 602 are attached by a seal pattern 604 in a facing manner. A gap is maintained between the thin film transistor array substrate 601 and a color filter substrate 602 by a spacer 603. A liquid crystal layer 605 is formed in the gap between the thin film transistor array substrate 601 and the color filter substrate 602.

The thin film transistor array substrate 601 is formed having protruded portion as compared to the color filter substrate 602. At the protruded portion, a gate pad part is connected to gate lines of the thin film transistor array substrate 601 and a data pad part is connected to data lines of the thin film transistor array substrate 601. In the image display part of the thin film transistor array substrate 601, gate lines to which a scan signal is applied through the gate pad part and data lines to which image information is applied through the data pad part are arranged to cross each other, and a thin film transistor for switching the liquid crystal cells is formed at the crossing. Further, a pixel electrode connected to the thin film transistor is formed in the image display part of the thin film transistor array substrate 601.

In the image display part of the color filter substrate 602, color filters are provided in the cell regions and separated by a black matrix. A common transparent electrode (not shown) for driving the liquid crystal layer together with the pixel electrode may be formed on the thin film transistor array substrate 601. A common voltage line 607 for applying a common voltage to a common electrode 606 formed on the color filter substrate 602 may also be formed on the thin film transistor array substrate 601.

An Ag dot 608 is formed either on the thin film transistor array substrate 601 or the color filter substrate 602 to electrically connect the common voltage line 607 and the common electrode 606, so that the common voltage applied to the common voltage line 607 may be applied to the common electrode 606 by way of the Ag dot 608. At least one or more Ag dots 608 are formed at each of the plurality of unit liquid crystal display panels fabricated on the large-scale mother substrate, which may be also formed by using the dispenser for a liquid crystal display panel in accordance with the present invention. Namely, the plurality of syringes 503A~503C are filled with Ag, and while the table 500 with the substrate 501 loaded thereon is horizontally moved, Ag is applied through the nozzles 504A~504C provided at each one end portion of the syringes to form Ag dot 608 at each outer edge of the image display parts of the substrate 501.

In the case of forming the Ag dot 608 on the substrate 501 by using the dispenser, the gap between the nozzles 504A~504C of the syringes 503A~503C and the substrate 501 should be precisely controlled like in the cases of forming the seal patterns 516A~516C and dropping liquid crystal. Therefore, as shown in FIGS. 6A to 6C, the nozzles 504A~504C of the syringes 503A~503C are adjusted in order to have a desired gap between themselves and the aligning substrate 502 by using the aligning substrate 502 attached at one side of the table 500, and then the Ag dot 608 is formed at an outer edge of the image display area of the substrate 501.

As so far described, the dispenser for a liquid crystal display panel and the dispensing method using the dispenser in accordance with the present invention has the following advantages. Even if the area of the substrate increases to fabricate large-scale liquid crystal display panel, the aligning substrate with an area that is a few times or scores of times narrower than the substrate is attached at the side of the table to adjust the nozzles such that they have a desired gap with respect to the aligning substrate or the plurality of syringes are aligned by using the aligning substrate and the seal patterns are formed on the substrate. Thus, the aligning substrate may be simply and easily attached and detached by the operator, accomplishing the effects of preventing process delays, improving productivity, preventing damage and lowering production costs. In addition, since the aligning substrate is so narrow, not much space is required, so that the space efficiency of the clean room is improved and facility expenses may be minimized.

It will be apparent to those skilled in the art that various modifications and variations can be made in the dispenser for liquid crystal display panel and dispensing method using the same of the present invention without departing from the spirit or scope of the inventions. Thus, it is intended that the present invention covers the modifications and variations of this invention provided they come within the scope of the appended claims and their equivalents.

What is claimed is:

1. A dispensing method for a liquid crystal display panel, comprising:

attaching an aligning unit to at least one side surface of a table;

positioning a plurality of syringes on the aligning unit;

lowering the syringes so that the nozzles provided at end portions of each of the plurality of syringes contacts the aligning unit;

raising the syringes so as to obtain a desired gap between the aligning unit and the nozzles;

cleaning the aligning unit to remove material remaining on the aligning unit caused by the contact of the syringes and the aligning unit;

applying a material onto the cleaned aligning unit attached to side of the table through the nozzles and forming a plurality of alignment patterns on the aligning unit;

detecting an image of the alignment patterns on the aligning unit through an image camera provided at each side of the plurality of the syringes;

aligning the plurality of syringes on the basis of the image of the alignment patterns on the aligning unit detected by the image camera;

providing a substrate onto the top surface of the table, the substrate being adjacent to the aligning unit and the height of the substrate being same as that of the aligning unit; and moving the table in the direction along which the aligning unit is attached in the table to dispose the syringe over the dispensing position of the substrate from the position of the aligning unit attached to one side of the table to dispense the material onto the substrate through the plurality of syringes, wherein the substrate having a flat upper surface and the height of the upper surface of the aligning substrate is same as that of the substrate so that the syringe is raised at the set height from the surface of the aligning substrate and the height of the syringe from the surface of the substrate is constant over the whole area of the substrate.

2. The method of claim 1, wherein dispensing a material includes dispensing a sealant.

3. The method of claim 1, wherein the aligning substrate is made of a glass.

4. The method of claim 1, wherein dispensing a material includes dispensing liquid crystal.

5. The method of claim 1, wherein dispensing a material includes dispensing silver (Ag).

* * * * *